United States Patent [19]

Köhler et al.

[11] Patent Number: 5,064,895
[45] Date of Patent: Nov. 12, 1991

[54] POLYARYLENE SULFIDE MOLDING COMPOUNDS AND THEIR USE AS AN ENCAPSULATING COMPOUND FOR ACTIVE AND PASSIVE ELECTRONIC COMPONENTS

[75] Inventors: Karl-Heinz Köhler, Krefeld; Klaus Reinking, Wermelskirchen; Klaus Kraft, Krefeld; all of Fed. Rep. of Germany

[73] Assignee: Bayer Aktiengesellschaft, Leverkusen, Fed. Rep. of Germany

[21] Appl. No.: 389,943

[22] Filed: Aug. 7, 1989

[30] Foreign Application Priority Data

Aug. 18, 1988 [DE] Fed. Rep. of Germany ....... 3828056

[51] Int. Cl.$^5$ .............................................. C08L 77/00
[52] U.S. Cl. .................................... 524/609; 528/388; 528/499
[58] Field of Search ................. 524/609; 528/499, 388

[56] References Cited

U.S. PATENT DOCUMENTS 4,730,034 3/1988 Nesheiwat et al. .

FOREIGN PATENT DOCUMENTS 0100913 7/1983 European Pat. Off. .
0214471 6/1986 European Pat. Off. .
0265524 3/1987 European Pat. Off. .
0306025 1/1988 European Pat. Off. .
0299276 6/1988 European Pat. Off. .

*Primary Examiner*—Morton Foelak
*Attorney, Agent, or Firm*—Connolly and Hutz

[57] ABSTRACT

The invention relates to molding compounds of polyarylene sulfides (PAS), preferably polyphenylene sulfides (PPS), which have a low ion content and delayed crystallization and to their use as an encapsulating compound for active and passive electronic components.

6 Claims, No Drawings

POLYARYLENE SULFIDE MOLDING COMPOUNDS AND THEIR USE AS AN ENCAPSULATING COMPOUND FOR ACTIVE AND PASSIVE ELECTRONIC COMPONENTS

This invention relates to molding compounds of polyarylene sulfides (PAS), preferably polyphenylene sulfides (PPS), having a low ion content and delayed crystallization and to their use as an encapsulating compound for active and passive electronic components.

Polyarylene sulfide molding compounds and their use in the electronics field are known (cf. for example EP-OS 119 607, EP-OS 100 913).

However, certain electronic components impose stringent demands on the materials with which they are encapsulated by injection molding to safeguard their operation. Thus, the encapsulation of microchips for example requires encapsulating compounds which have a very low content of residual ions, which show very high thermal, chemical and hydrolytic stability and which do not mechanically deform the electronic component to be encapsulated during injection molding.

It is known that, if moisture diffuses into the component, electrolytes can form through partial dissolution of inhomogeneous constituents in the encapsulating compound, giving rise to unwanted troublesome electrical currents which can impair the electronic function of the components.

The need for thermal, chemical and hydrolytic stability arises out of the production and the subsequent machining and assembly of the electronic components. For example, soldering involves high temperatures at which the flame resistance of the material is important. Subsequent treatments such as, for example, chemical etching, cleaning, etc., and the effect of atmospheric moisture require chemical and hydrolytic stability on the part of the thermoplastic used.

Polyarylene sulfides, particularly polyphenylene sulfides, satisfy these requirements to a high degree. However, it has been found that the encapsulation by injection molding of mechanically sensitive components can result in deformation, including for example drifting or breakage of bond wires on microchips, which can disturb or destroy the electronic function of the components. Such deformation processes, which take place during encapsulation of the component by injection molding, cannot be avoided even by satisfactory mold design if the viscosity of the inflowing melt is too high. The viscosity of the inflowing melt is essentially determined by the type and quantity of filler, by the viscosity of the polyarylene sulfide used and by the crystallization behavior of the polyarylene sulfide.

The type and quantity of filler used are generally determined by the requirements the molding compound has to satisfy and can only be varied within narrow limits.

The viscosity of the polyarylene sulfide used has to be low. The result of this is that, on account of the increasing crystallization rate of polyarylene sulfides and their decreasing viscosity or ·relatively low molecular weight, premature crystallization begins during the injection molding process and, in turn, gives rise to an increase in the viscosity of the melt. In other words, there are limits to the reduction in the viscosity or molecular weight of the polyarylene sulfide used unless its crystallization can be correspondingly delayed.

It is known that the crystallization of polyarylene sulfides can be supressed very considerably or even eliminated altogether where the polyarylene sulfides consist of certain structural elements or contain them in the form of co-polyarylene sulfides, including for example m-phenylene sulfide units (cf. for example DE-OS 2 953 485) or alkyl phenylene sulfide units (Houben-Weyl, Vol. E 20, column 2548) or other comonomer units (cf. for example DE-OS 3 637 813).

Compared with partially crystalline polyarylene sulfides, amorphous or incompletely crystallizing polyarylene sulfides such as these lose key properties, including for example thermal, chemical and hydrolytic stability. Accordingly, there is a need for partially crystalline materials which have sufficiently high melting points to be dimensionally stable even, for example, to soldering baths which are heated to temperatures of around 260° C.

Accordingly, the object of the present invention is to provide free-flowing molding compounds which contain partially crystalline polyarylene sulfides having a melting point above 260° C. which do not crystallize prematurely, i.e. before the mold is filled, during encapsulation by injection molding and which, in addition, have a low ion content.

It has now been found that certain (co)polyarylene sulfides, preferably (co)polyphenylene sulfides, of low melt viscosity, which have a particularly low ion content, satisfy the stated requirements.

The molding compounds according to the invention consist of

A) 20 to 100% by weight polyarylene sulfides, preferably polyphenylene sulfides, having a melt viscosity of 5 to 20 Pa.s, a melting point above 260 C, crystallization behavior corresponding to the following mathematical relation (I)

$$t_{gc}(170) > t_c(T_0) \cdot \frac{U(170)}{U(T.)}, \quad (I)$$

and a total ion content of less than 200 ppm and

B) 0 to 80% by weight fillers.

Preferred molding compounds consist of 30 to 90% by weight of the polyarylene sulfides mentioned, preferably polyphenylene sulfide, and 70 to 10% by weight fillers.

In equation (I), $$U(T) = 10^{[C_1/T - 90t + C_2/(T+273) \cdot (301-T)]};$$

$t_c(170)$ is the isothermal crystallization time at 170° C. and $t_c(T.)$ is the isothermal crystallization time at an given temperature T. at which $t_c$ may readily be determined; U is a function of the temperature in which $C_1 = 55.9$ and $C_2 = 93\,538$.

The polyarylene sulfides of the molding compounds according to the invention have a melt viscosity of 5 to 20 Pa.s (as measured at 306° C. at a shear rate of $10^3$: (1/s)), preferably below 15 Pa.s and, more preferably, below 10 Pa.s. They have a melting point $T_M$ above 260° C. and preferably above 270° C.

The polyarylene sulfides of the molding compounds according to the invention, have a total ion content, based on polyarylene sulfides of less than 200 ppm, preferably less than 100 ppm and more preferably less than 50 ppm.

The reduction in the crystallization rate can be achieved by using 1 to 5 mol % comonomer (based on aromatic dihalogen compound, for example p-dichlorobenzene). The polymers may be produced from corresponding starting materials, for example in accordance with DE-OS 3 637 813, EP-OS 171 021, U.S. Pat. No. 3,354,129, etc.

To establish the content of (water-) soluble ions according to the invention, the polyarylene sulfides or copolyphenylene suflfides produced by known methods are brought after the polymerization reaction to a suitable temperature in known manner by continuous conditioning at a defined cooling rate, introduced into a diluent, ($C_1$-$C_{10}$ alcohol) and then washed with a liquid (for example water) and, optionally, dried.

The continuous conditioning may be carried out in known manner, for example by stirring the reaction solution, by introducing the reaction solution into cooling systems or by blowing cooled gases (for example air, nitrogen, etc.) through the reaction solution.

The polymer is cooled to a temperature of 15 to 150° C.

The cooling rate may be varied within wide limits, for example from 100° C./second to 100 C./hour and preferably from 80° C./minute to 200° C./minute.

The polymer may optionally be dried by standard methods, for example in vacuo (up to $10^{-3}$ bar) at elevated temperature (for example up to 150° C.).

The total ion content comprises the sum of cations and anions. Examples of such cations are $H^+$, $Li^+$, $Na^+$, $K^+$, $Fe^{2+}$, $Ti^{2+}$, etc.; examples of anions are $Cl^-$, $Br^-$, $SO_n^{2-}$ (for example $SO_3^{2-}$, $SO_4^{2-}$), carboxylates, etc.

The cations may be determined by standard methods of elemental analysis, for example atomic absorption spectroscopy (for example after suitable digestion). The anions may be determined, for example, after dissolution of the polyarylene sulfide in a suitable solvent, etc.

Polyarylene sulfides and copolyarylene sulfides, which are suitable for the molding compounds according to the invention, are obtained by known methods (cf. for example DE-OS 3 529 500, 3 529 501, 3 529 498) suitably modified both in regard to the actual production process (DE-OS 3 637 813) and in regard to working up.

The low ion content of the polyarylene sulfide according to the invention is established, for example, by conditioning processes in suitable solvents in which ionic constituents are largely removed from the polyarylene sulfides.

The molding compounds according to the invention contain fillers which are substantially free from water-soluble ions. Examples of such fillers are quartz powder, fused silica, kaolin, mica, talcum, $BaSO_4$, glass beads, precipitated fumed silica, etc.; preferred fillers are quartz powder, fused silica. The fillers may also be fibrous reinforcing materials, particularly inorganic fibers, such as glass fibers for example.

The fillers may contain suitable sizes and/or primers.

The quantity of filler may amount to at most 80% by weight, based on the molding compound, and is preferably less than 70% by weight. Particulate and fibrous fillers may be present alongside one another, in which case the fibrous component preferably makes up less than 50% by weight of the total filler.

The molding compounds have a melt viscosity at 340° C. and at a shear rate $\gamma$ (gamma point) of $10^3$ (1/s of less than 100 Pa.s, preferably less than 80 Pa.s and, more preferably, less than 50 Pa.s.

In addition, the molding compounds according to the invention may contain standard processing aids, for example mold release agents, flow promoters for improving flow, standard stabilizers, for example for increasing thermal and UV stability, etc.

The molding compounds are produced by melt compounding in standard machines, such as kneaders or twin-screw extruders.

The molding compounds according to the invention are used, for example, for the encapsulation by injection molding of passive components, such as capacitors, resistors, and active components, transistors, diodes and integrated circuits (for example microchips), etc., which are soldered to circuit boards inter alia by the SMD (surface-mounted-device) process. They are also suitable for the encapsulation by injection molding of switches and relays.

Examples

A. Comparison Examples

Production of a polyarylene sulfide by any of Examples 2 to 8 of DE-OS 3 637 813 (columns 5 and 6), isolation in the usual way meaning that the hot reaction mixture is precipitated in an aliphatic alcohol and the crude PPS is washed with alcohol and water to remove soluble constituents.

B. Examples according to the Invention

1 Production of a polyarylene sulfide by any of Examples 1 to 8 of DE-OS 3 637 813 (columns 5 and 6), the reaction mixture being subjected to continuous conditioning by standard methods. The cooled reaction mixture is introduced into an aliphatic alcohol (for example a $C_1$-$C_6$ alcohol) as diluent, filtered, acidified in the usual way and washed with a liquid, for example water.

2. Production of a polyarylene sulfide in accordance with Example Bl., a total of 1186.3 g p-dichlorobenzene and, in addition, 36.7 g m-dichlorobenzene being used; the m-dichlorobenzene is initially introduced with p-dichlorobenzene.

3. Production of a polyarylene sulfide in accordance with Example Bl., a total of 1223 g p-dichlorobenzene and, in addition, 62.5 g 2-(2,5-dichlorophenyl)-2,4-dihydro-5-methyl-3-pyrazolone being used; the methyl pyrazolone is added after the removal of water.

TABLE

| Ions (ppm) | Reduction of the ion content of polyarylene sulfide by working up in accordance with the invention: | |
|---|---|---|
| | Examples A (Comparison) | Examples B (Invention) |
| $Na^+$ | >200 | <20 |
| $K^+$ | >5 | <1 |
| $Fe^{3+}$ | >40 | <20 |
| $Cl^-$ | >80 | <5 |

The copolyarylene sulfides thus obtained were extruded in the melt with 60% by weight quartz powder, based on compound, in a ZSK 32 (Werner and Pfleiderer) and granulated.

The molding compound thus obtained (40 Pa.s at $\gamma = 10^3$ (1/s)(340°)) was used to encapsulate microchips, of which the semiconductor crystals and the external contacts were conductively connected with 25 μm thin gold wires by injection molding in a test mold at a melt temperature of 360° C.

X-ray photographs of the encapsulated microchips showed that the bond wires were deformed (had drifted) so negligibly that there were no visible overlaps.

B

The molding compound made from B (60 Pa.s at $\gamma=10^3$ (1/s)) produces distinct drifting and, in some cases, breakage of the bond wires for the same processing conditions.

Example 3

Transistors were encapsulated by injection molding with molding compound A and then stored for 1000 h in a steam bath at 121° C. The reverse current was then measured (11 nA (Nano-Ampere)).

Example 4

Transistors were similarly encapsulated by injection molding with molding compound B, stored and tested. The reverse current was 160 nA.

We claim:

1. Thermoplastic molding compounds consisting of
A) 20 to 100% by weight polyarylene sulfides, having a melt viscosity of 5 to 20 Pa.s, a melting point above 260° C., crystallization behavior corresponding to the following mathematical relation (I)

$$tg_c(170) > t_c(To) \cdot \frac{U(170)}{U(T.)}, \quad (I)$$

and a total ion content of less than 200 ppm and
B) 0 to 80% by weight fillers.

2. Molding compounds as claimed in claim 1, characterized in that their cation and anion content is less than 100 ppm, based on polyarylene sulfide.

3. Molding compounds as claimed in claim 1, characterized in that their cation and anion content is less than 50 ppm, based on polyarylene sulfide.

4. Molding compounds as claimed in claim 1, characterized in that their melt viscosity at 340° C. and at $\gamma=10^3$ (1/s) is less than 80 Pa.s.

5. Molding compounds as claimed in claim 1, characterized in that their melt viscosity at 340° C. and at $\gamma=10^3$ (1/s) is below than 50 Pa.s.

6. Molding compounds as claimed in claim 1 containing A) 30 to 90% by weight polyarylene sulfide and B) 70 to 10% by weight fillers.

* * * * *